Patented July 20, 1937

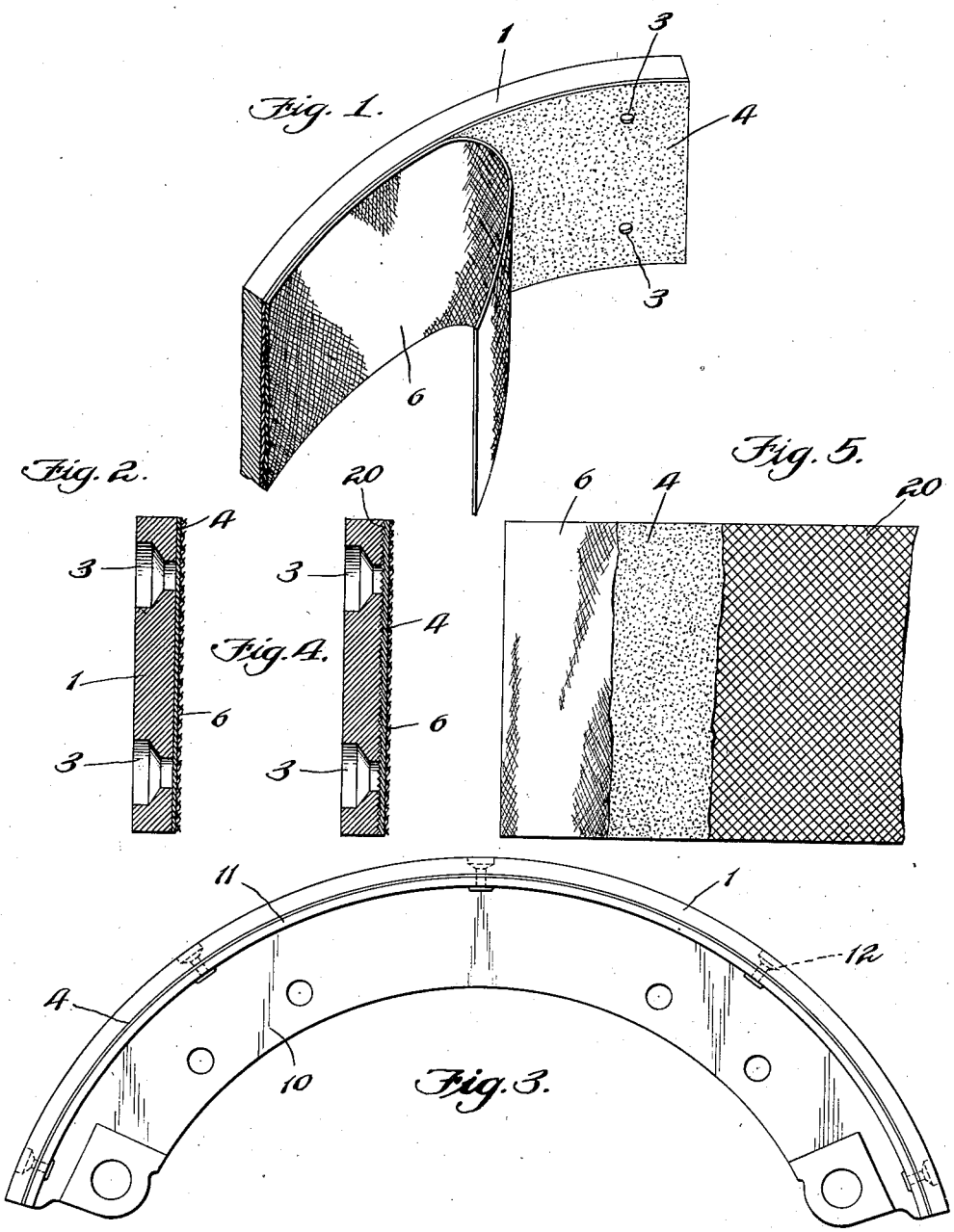

2,087,453

UNITED STATES PATENT OFFICE 2,087,453

BRAKE LINER

Marshall Steder, Chicago, Ill., assignor to L. J. Miley Company, Chicago, Ill., a corporation of Illinois Application May 9, 1936, Serial No. 78,885

5 Claims. (Cl. 188—251)

This invention relates to brake liners, such as are adapted to be applied to brake shoes, or brake drums.

Consider a brake shoe of a conventional automobile brake, by way of example. The brake shoe has the brake liner secured thereto, generally by rivets. It is now customary to sell brake liners already cut to size and provided with rivet holes properly spaced to fit the liner strip on the brake shoe of a predetermined standard automobile.

There are certain objections to the use of rivets for securing the brake liner to the brake shoe, but insofar as I have been able to ascertain, no better way of securing the two together has, heretofore, been provided. It is one of the objects of the present invention to provide a brake liner which is so constructed and arranged that it can be readily applied to a brake shoe, for example, with or without the use of rivets. If rivets are used they may be of a smaller size, or fewer in number, than is now generally required.

Another one of the troublesome features of present day brake shoe liners lies in the fact that dirt, or moisture, may enter into the small spaces between the brake liner and the brake shoe, and in time produce harmful results. To prevent this it has, heretofore, been proposed to fill the irregularities of the brake shoe surface with some plastic material which is relied upon only for preventing the ingress of foreign matter into the space between the brake shoe and the brake liner. It is an object of the present invention to provide a suitable filler in the space between the brake shoe and the brake liner for preventing the entrance of foreign materials into that space, which filler may also be utilized to secure, or to help secure, the brake liner to the brake shoe. I propose to use, as a filler, a cementitious material. The material used is one which will adhere to the brake liner and which will adhere to the brake shoe. A rubberized cement is one suitable material.

It is a still further object of the present invention to provide a brake shoe liner which has, applied to it, a suitable cementitious material, and can be sold as an article of manufacture with said material in place so that the liner is ready for use. The liner may be any suitable type of liner, for instance, the woven type, the molded type, or any other type. That surface of the liner which is to engage the brake shoe is coated with a suitable cementitious material. If the cementitious material is of the plastic or tacky type it may be covered by a protecting layer of cloth, suitable paper, or the like, so that it remains in its plastic condition during shipment and storage of the liner, which covering may be removed immediately before the liner is to be applied to the brake shoe. The liner may then be cemented directly to the brake shoe without the necessity for brushing additional plastic material onto the brake shoe, or onto the liner. If desired the cementitious material alone may be relied upon for holding the brake liner in place. On other installations the liner may, in addition, be riveted in place, or any one of a plurality of other additional means may be provided such as, for instance, a tongue and groove arrangement on the liner and on the brake shoe. If desired, the cementitious material may be of a kind which ordinarily is dry and must be treated in a suitable manner to make it adhesive. When this is the case a protective layer of cloth, or the like, need not be applied to the brake shoe. Such cementitious materials may be of the type that are rendered effective by applying water, or other chemicals thereto. If the cementitious material is of the type that is rendered effective by the application of water thereto it must also be of the type wherein the process is non-reversible so that after its first drying a subsequent wetting thereof does not again make it plastic.

While I have here spoken of a brake shoe, to which the brake liner is to be applied, it is to be understood that the present invention is equally applicable to brake liners that are to be applied to brake bands instead of to brake shoes.

The attainment of the above and further objects of the present invention will be apparent from the following specification taken in conjunction with the accompanying drawing forming a part thereof.

In the drawing:

Figure 1 is a fragmentary perspective view of a portion of a brake liner constructed in accordance with the teachings of the present invention, a part of the protective covering being removed for illustrative purposes;

Figure 2 is a sectional view of the liner of the present invention;

Figure 3 is a diagrammatic view illustrating the liner as applied to a conventional brake shoe;

Figure 4 is a sectional view, corresponding to Figure 2, and illustrating a modified construction; and Figure 5 is a fragmentary view of the inner-surface of the brake liner of Figure 4.

Reference may now be had to Figure 1 showing one embodiment of the present invention. A brake liner is indicated at 1. This liner may be of any standard construction, may be the woven type, or the molded type, or any other desired type, and is of a length and width requisite for fitting on the brake shoe of one standard type of automobile. It is provided with a plurality of rivet holes 3—3 properly spaced in relation to the spacing of corresponding rivet holes on the brake shoe to which the liner is to be applied. If desired, the rivet holes may be entirely omitted. A coating 4, of plastic cementitious material, is applied to one surface of the brake liner, namely, the surface that is to be applied to the brake shoe. Any desired, and suitable, type of cementitious material may be used. A rubberized cement is suitable. The purpose of this cementitious material is to cement the liner to the brake shoe. If the cementitious material is of the type that is plastic before it is used, there is applied a protective sheet 6 of paper, canvas, or the like, which protects and preserves the cementitious material and retains it in its plastic form. The sheet 6 may be removed readily from the liner, immediately before the liner is to be applied to the brake shoe. Thus, during the shipment and storage of the liner, the same is in a form such that it can conveniently be handled, while the cementitious material is prevented from setting. Instead of a moist, or sticky cementitious material I may use a type of cement or adhesive which when applied to the brake liner is not moist, or sticky, but becomes sticky when moistened with water, or when some other liquid chemical is applied thereto, such as alcohol, gasoline, kerosene, or the like. Of course, if the substance is one that becomes sticky by the application of water thereto, then it should be of the type wherein such a change takes place when it has been moistened and becomes dry that the process cannot again be repeated. This is essential because it is desired that once the brake liner is applied to the brake shoe it shall adhere thereto even though the brake shoe subsequently becomes wet, as is not at all unusual. When the cementitious material 4 that is applied to the brake liner 1 is of the dry type, mentioned above, the protective sheet 6 may be entirely omitted.

In order to apply the brake liner of Figure 1 to a standard form of brake shoe for which this particular liner is designed, it is merely necessary to remove the sheet 6 and then place the liner over the brake shoe. The cementitious material 4 will fill any slight irregularities in the brake shoe surface, thus preventing the entrance of moisture, dirt, or other foreign material between the liner and the brake shoe. The cementitious material will also serve to secure the liner to the brake shoe, since the material is such that it will adhere to the surface of the brake shoe.

In Figure 3 I have shown a standard type of metal brake shoe which is of a T-shaped cross section, having a stem 10 and a liner receiving flange 11. The brake liner 1 is applied to the flange 11, to which the cementitious material 4 adheres, thus cementing the liner to the brake shoe. In Figure 3 I have shown the usual rivets 12 that are generally used for riveting a brake liner to a brake shoe. These rivets serve as additional holding means for the brake liner. If desired, these rivets may be entirely omitted, or some of them may be omitted.

In Figures 4 and 5 I have shown a modified form of brake shoe liner. The modification consists, essentially, in the fact that the inner surface of the liner is roughened, by milling or knurling, as indicated at 20. This increases the surface with which the cementitious material 4 is in contact, thereby increasing the hold of the cementitious material on the liner.

While I have shown, in Figure 5, the knurling in the form of closely spaced grooves crossing one another, it is to be understood that any other desired type of roughening or groove formation may be used.

While I have here shown my brake liner as applied to a brake shoe, it is, of course, understood that the liner may also be designed for application to a brake band, instead of a brake shoe.

In compliance with the requirements of the patent statutes I have here shown and described a few preferred embodiments of my invention. It is, however, to be understood that the invention is not limited to the precise constructions here shown, the same being merely illustrative of the principles of the invention. What I consider new and desire to secure by Letters Patent is:

1. A brake liner comprising a body of preformed brake lining material having a plastic coating applied to one surface thereof, and a removable protective cover over said coating.

2. A brake liner comprising a body of preformed brake lining material having a cementitious coating applied to one surface thereof, and a removable protective cover over said coating.

3. A brake liner adapted for shipment or storage, said liner comprising a body of brake lining material and a coating of cementitious material on one surface of the lining material, the coated liner being conditioned so that the exposed surfaces thereof are dry and non-tacky.

4. A brake liner comprising a body of brake lining material for attachment to one part of two relatively movable braking elements of a brake, one surface of the material being roughened to increase the effective surface area, a layer of cementitious material coating said roughened surface, and a removable protective covering over said coated surface.

5. A brake liner comprising a body of brake lining material for attachment to one of two relatively movable braking elements of a brake to constitute a gripping surface for effecting a braking action, one surface of said liner being coated with a cementitious material which is effective at room temperature to cement the liner to said braking element, and said coated liner being conditioned for shipment and storage apart from a braking element to which it is to be attached.

MARSHALL STEDER.